(No Model.)
C. C. HAYES.
RUNNING GEAR FOR VEHICLES.
No. 437,778. Patented Oct. 7, 1890.
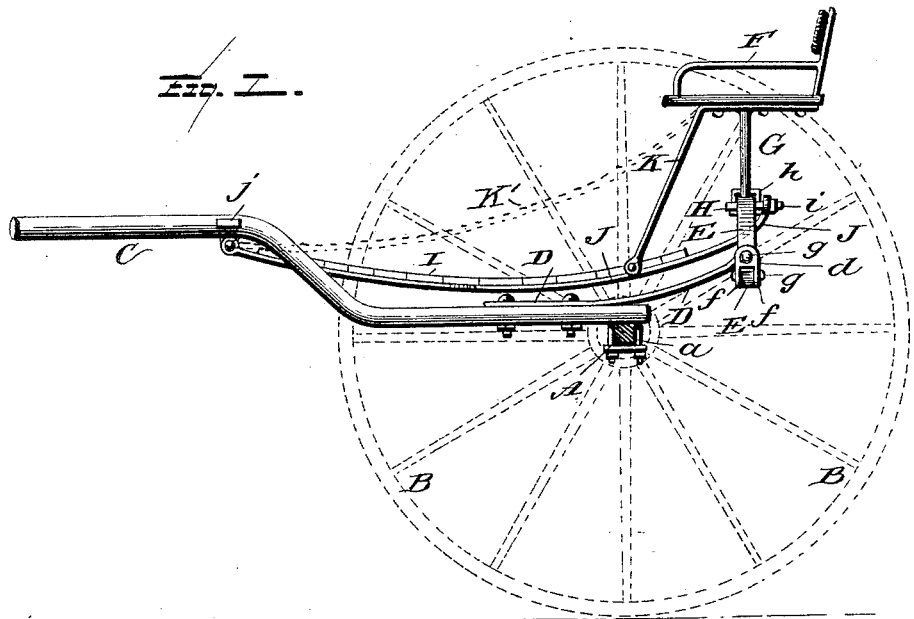
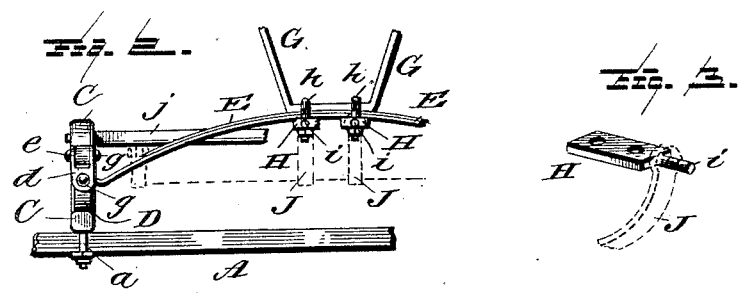
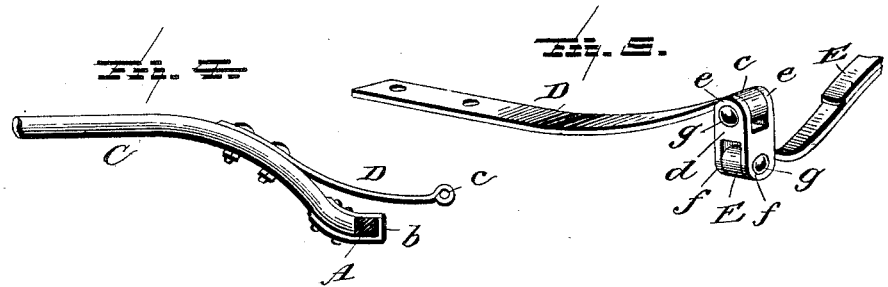
Witnesses
L. C. Hills
E. H. Bond
Inventor
Charles C. Hayes,
per Chas. N. Fowler,
Attorney

UNITED STATES PATENT OFFICE.

CHARLES C. HAYES, OF PENN YAN, NEW YORK.

RUNNING-GEAR FOR VEHICLES.

SPECIFICATION forming part of Letters Patent No. 437,778, dated October 7, 1890.

Application filed June 30, 1890. Serial No. 357,251. (No model.)

*To all whom it may concern:*

Be it known that I, CHARLES C. HAYES, a citizen of the United States, residing at Penn Yan, in the county of Yates and State of New York, have invented certain new and useful Improvements in Running-Gears; and I do hereby declare that the following is a full, clear, and exact description of the same, reference being had to the annexed drawings, making a part of this specification, and to the letters of reference marked thereon.

This invention relates to certain new and useful improvements in running-gears for vehicles; and it has for its object, among others, to provide an improved easy-riding sulky of few parts, and those so arranged as to form a strong and durable vehicle.

The novelty resides in the peculiar combinations and the construction, arrangement, and adaptation of parts, all as more fully hereinafter described, shown in the drawings, and then particularly pointed out in the appended claim.

The invention is clearly illustrated in the accompanying drawings, which, with the letters of reference marked thereon, form a part of this specification, and in which—

Figure 1 is a side view of a two-wheeled vehicle embodying my invention. Fig. 2 is a detail in rear elevation. Fig. 3 is a perspective view showing one of the plates to which the rear end of the foot-rest is attached. Fig. 4 is a detail in side elevation of a modification. Fig. 5 is a perspective detail showing the manner of connecting the rear and side springs.

Like letters of reference indicate like parts throughout the several views.

Referring now to the details of the drawings by letter, A designates the axle, B the wheel, and C the shafts, of any approved construction. The shafts may have their rear ends horizontal, as shown in Fig. 1, and attached to the axle by the clips $a$, or they may be curved downward at their rear ends and secured to the axle by the metal bands $b$, as shown in Fig. 4, or in any other desired manner.

D are springs attached at one end to the rear ends of the shafts, as shown, and at their rear ends formed with eyes or other analogous provisions $c$ for attachment to the cross-spring E, which spring is arranged to the rear of the axle, and is preferably connected with the side springs D by means of the hangers $d$, one of which is shown clearly in Fig. 5. It is formed with ears $e$ and $f$, the ears $e$ being arranged at right angles to the ears $f$, and between the ears $e$ the rear ends of the springs D are pivotally held by the pins or bolts $g$, which pass through said ears and through the eyes of the rear ends of the springs D, as seen in Fig. 4. The ends of the spring E are held in the ears $f$, in a similar manner.

F is the seat, provided upon its under side with the support G, which is a substantially U-shaped bar, as seen in Fig. 2, the horizontal portion of which is secured to the cross-spring E, as seen in said Fig. 2, by means of clips $h$, each of which also secures to the under side of said springs a plate H, provided with a projection or pin portion $i$, as seen in Fig. 3.

I is the foot-rest, provided with the side or longitudinal supporting-bars J, which are pivotally secured at their forward ends to the cross-bar $j$ of the shafts, and at their rear ends held by the pins $i$ on the plates H, as seen in Figs. 1 and 3.

K are brace-rods for the seat, attached to the under side of the seat and to the sides of the foot-rest, or to the cross-bar $j$, as preferred.

When the shafts are of the form shown in Fig. 1, the springs D are turned upward at their rear ends; but with the form of shafts shown in Fig. 4 they are inclined downward. By the employment of the short semi-elliptic springs D and attaching said springs to the shafts the strain is taken from the main or cross spring, and the latter is less liable to break, as with other cross-springs attached in the ordinary way.

It may sometimes be found desirable to convert the road-cart into a sulky, and to accomplish this, instead of attaching the ends of the brace-rods K to the supporting-bars J, I remove the foot-rest I and have the brace-rods of sufficient length to connect the ends to the cross-bar $j$, as shown at K', dotted lines. The forward ends of the brace-rods K' may be connected to the cross-bar $j$ in any suitable manner, but preferably by loop-eyes or hooks, or other like hinge-connection. I think it would be preferable in either case to have the brace-rods of sufficient length to extend to the cross-bar $j$ and connect the ends thereto whether the foot-rest I is used or not, thus adapting the construction to the changes above mentioned without having to change the brace-rods K and substituting longer ones.

Having now fully described my invention, what I claim as new, and desire to secure by Letters Patent, is—

The combination, with the axle, wheels, and shafts, of the rear cross-spring, the side springs pivotally connected to the ends of the cross-spring and rigidly attached to the shafts, the U-shaped support G, supporting the seat, the plates H, having rearwardly-projecting pins $i$, the clips securing said plates, support, and cross-spring together, and the foot-rest I, having supporting-bars J, having their rear ends sleeved on the pins $i$ of the plates H, and at their forward ends pivotally secured to the cross-bar of the shafts, substantially as specified.

In testimony that I claim the above I have hereunto subscribed my name in the presence of two witnesses.

CHARLES C. HAYES.

Witnesses:
ALEX. S. STEUART,
CHAS. H. FOWLER.